Feb. 26, 1952 — W. J. CARROLL — 2,587,109
FILM HOLDER
Filed July 14, 1947

Inventor
William J. Carroll
By Clarence A. O'Brien
and Harvey B. Jacobson
Attorneys Patented Feb. 26, 1952

2,587,109

UNITED STATES PATENT OFFICE 2,587,109

FILM HOLDER

William J. Carroll, Los Angeles, Calif.

Application July 14, 1947, Serial No. 760,717

3 Claims. (Cl. 40—159)

This invention relates to new and useful improvements in film holders and the primary object of the present invention is to provide a simple and practical frame that will hold negatives and the like to be shown in projector machines.

Another important object of the present invention is to provide a film holder embodying novel and improved means for engaging the edges of a film.

A further object of the present invention is the provision of a holder for the above purposes, all parts of which may be formed in a single stamping process.

A still further aim of the present invention is to provide a film holder that is strong and durable in construction, practical in application to a film, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
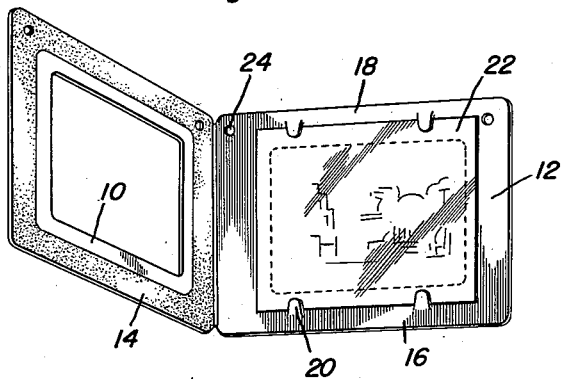
Figure 1 is a perspective view of the present holder in use and showing the frames thereof in an open position.
Figure 2:
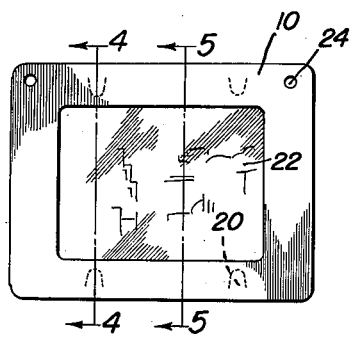
Figure 2 is a front elevational view of the present holder in use.
Figure 3:
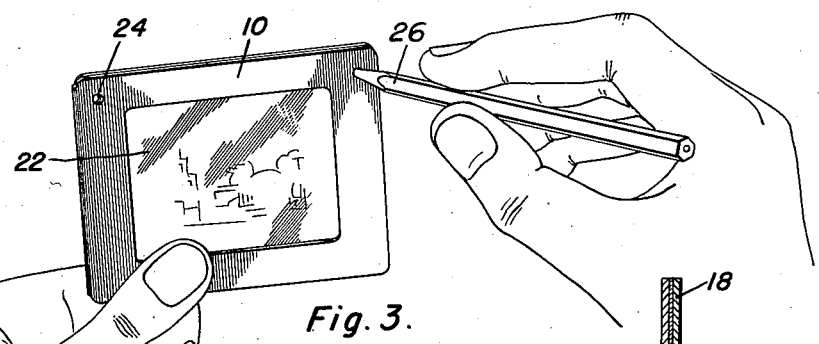
Figure 3 is a perspective view showing the manner in which the side edges of the frame forming the holder are aligned.
Figure 4:
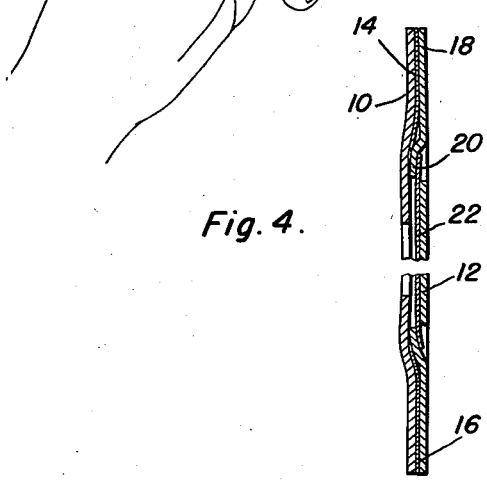
Figure 4 is a vertical transverse sectional view taken substantially on the plane of section line 4—4 of Figure 2; and, Figure 5 is a vertical transverse sectional view taken substantially on the plane of section line 5—5 of Figure 2.
Figure 5:
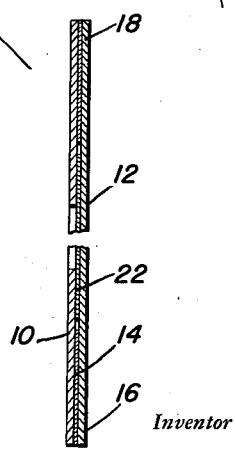

Referring now to the drawings in detail, wherein for the purpose of illustration, there is disclosed a preferred embodiment of the present invention, the numeral 10 represents a first substantially rectangular frame hinged at one edge to a second rectangular frame 12 of preferably the same size as frame 10. These frames are preferably rectangular and are formed of a relatively inexpensive material such as cardboard, plastic or the like.

The inner face of one of these frames, for example, 10, is coated with a substantially rectangular adhesive material 14 of slightly decreased width than the width of frame 10. The adhesive material 14 retains the frames 10 and 12 in juxtaposed relationship when moistened or heated.

Punched outwardly from the lower horizontal portion 16 and the upper horizontal portion 18 of one of the frames, for example 12, are tabs 20 that frictionally engage the edges of a film 22, preventing slipping of the film relative to the frames. These tabs may be punched only to include a portion of the thickness of the frame, so that there will be no opening in the frames to expose the film, whereby the film may be protected against tearing or the like, if it is desirous to do so. This will, however, involve a more intricate procedure than merely punching the tabs to include the entire thickness of the frame.

At selected corners of each of the frames are provided apertures 24 for a purpose which will later be described.

In practical use of the device, the tabs 20 are turned outwardly to engage the edges of a film 22 to center the film in the opening outlined by the frame.

The adhesive material 14 of frame 10 is then moistened and frame 10 swung inwardly to bear against frame 12 with a pencil or the like 26 being extended through aligned apertures to retain the frames in juxtaposed relationship. A weighted object (not shown) may be then placed on the frames until the frames are adhered to each other.

Obviously, the device may be used to hold positive prints in a neat and attractive manner as well as to hold negatives for use with projectors.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A film holder comprising a first substantially rectangular frame, a second substantially rectangular frame hinged at one transverse edge to one transverse edge of said first frame, said frames having opposed substantially rectangular openings, holding tabs struck from said second frame adjacent the longitudinal edges thereof and disposed between the longitudinal edges of said second frame and the opening therein, means for securing said frames to each other in juxtaposition, and means for aligning and retaining the peripheral edges of said frames flush as the frames are secured together, said last mentioned means including a plurality of apertures in said first frame, said second frame having a plurality of apertures in registry with the openings in said first frame.

2. The combination of claim 1 wherein said means for securing said frames to each other includes a substantially rectangular sheet of adhesive material superimposed on the inner face of said first frame and having an opening therein, the edges of said sheet of adhesive material defining the opening therein being spaced parallel to the edges of said first frame defining the opening in said first frame.

3. A film holder comprising a first substantially rectangular frame, a second substantially rectangular frame hinged at one transverse edge to one transverse edge of said first frame, said frames having opposed substantially rectangular openings holding tabs struck from said second frame adjacent the longitudinal edges thereof and disposed between the longitudinal edges of said second frame and the opening therein, adhesive material on the inner face of one of said frames for securing the frames in juxtaposition, said first frame having at least two apertures therein, said second frame also having at least two apertures therein, the apertures in said first frame being in registry with the apertures in said second frame, and a member received in selected registering apertures for centering said frames relative to each other as the frames are secured together by said adhesive material.

WILLIAM J. CARROLL.

REFERENCES CITED

The following references are of record in the file of this patent:

UNITED STATES PATENTS

| Number | Name | Date |
| --- | --- | --- |
| 498,761 | Becker | June 6, 1893 |
| 1,179,969 | Spitzer | April 18, 1916 |
| 1,435,762 | Tomsich | Nov. 14, 1922 |
| 1,520,041 | Walker | Dec. 23, 1924 |
| 2,176,283 | Whiteford | Oct. 17, 1939 |
| 2,184,007 | Stalhle | Dec. 19, 1939 |
| 2,291,173 | Simpson | July 28, 1942 |
| 2,427,554 | Drucker | Sept. 16, 1947 |